Sept. 22, 1970  J. McWILLIAMS  3,529,456
KEY-OPERATED SAFETY LOCK
Filed May 17, 1968
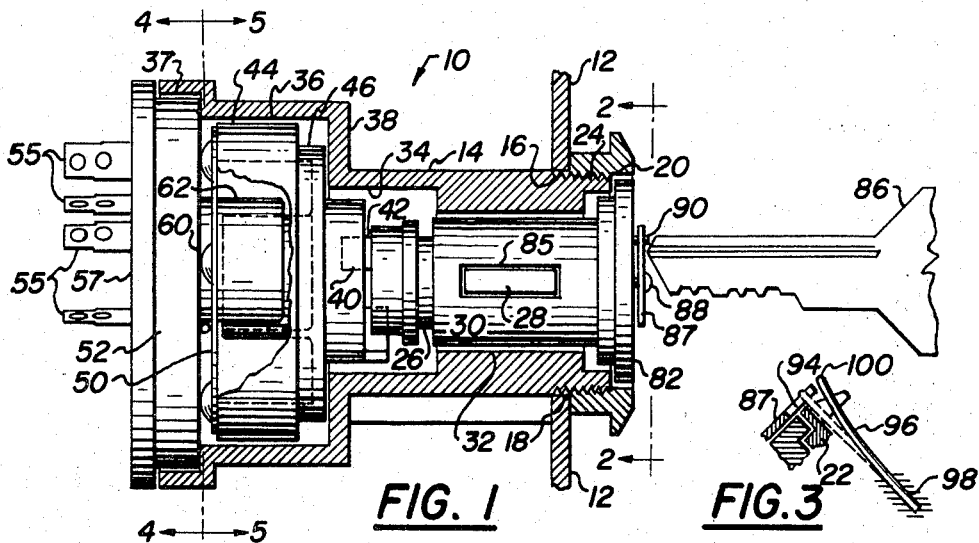
FIG. 1
FIG. 3
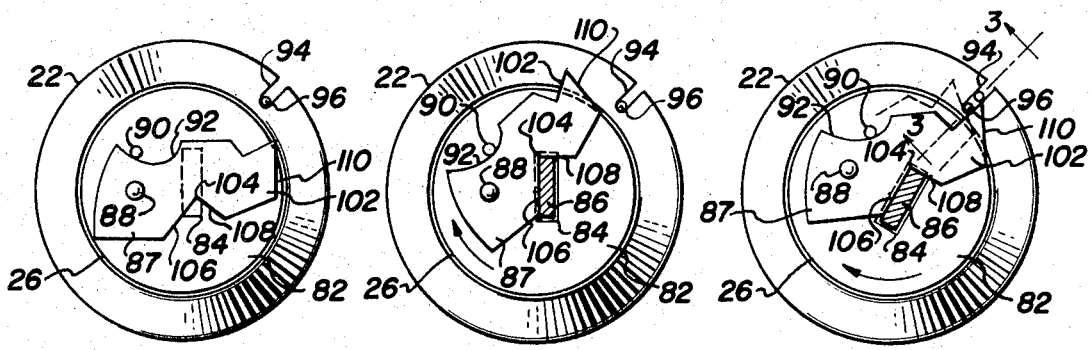
FIG. 2   FIG. 2a   FIG. 2b
FIG. 2c
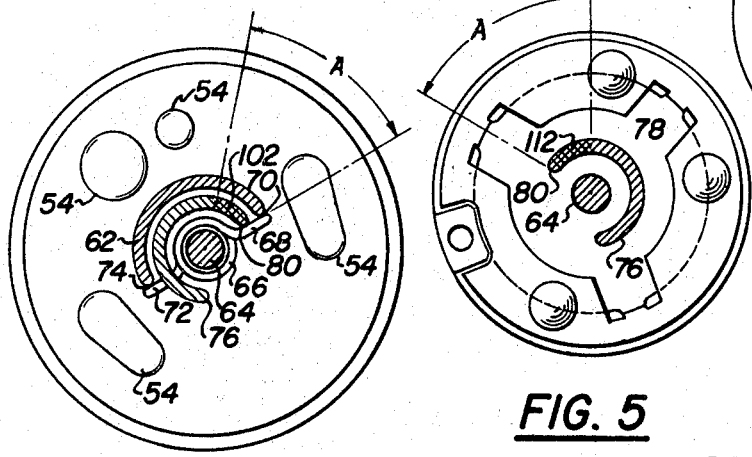
FIG. 4   FIG. 5
INVENTOR.
JAMES McWILLIAMS
BY
Robert L. Berger
ATTORNEY

United States Patent Office 3,529,456
Patented Sept. 22, 1970

3,529,456
KEY-OPERATED SAFETY LOCK
James McWilliams, Oak Hill Road,
Baltimore, Md. 21212
Filed May 17, 1968, Ser. No. 730,167
Int. Cl. E05b 15/00
U.S. Cl. 70—447      9 Claims

ABSTRACT OF THE DISCLOSURE

A key-operated, rotatable lock which can only be returned from an unlocked position to its locked position by removing the key therefrom. A pawl pivotally connected to the face of the lock is prevented from pivotal movement in one direction by contact with the key. Pivotal movement of the pawl and the lock in the other direction is prevented by contact of the pawl with a spring locking pin extending in front of the face of the lock when the lock has been turned to an unlocked position. When the key is withdrawn, the pawl pivots to a position clear of the spring locking pin and the force of a helical spring returns the lock to its locked position.

BACKGROUND OF THE INVENTION

Field of the invention

This invention relates to key-operated locks and, more particularly, to such devices which can only be returned to the locked position from an unlocked position by removal of the key.

Description of the prior art

Today, car theft represents a major portion of the crimes committed in this and other countries and presents Federal and local law enforcement agencies with a very serious problem. It is generally conceded that little can be done in the way of alarm systems, safety devices and other similar approaches to prevent the professional car thief from realizing his goal. However, statistical information compiled by Government agencies surprisingly shows that a substantial majority of the cars stolen in this country are not stolen by professional thieves. To the contrary, they are stolen by teenagers intent on a "joy ride." Probably just as surprising is the fact that in the majority of these latter instances, the owner of the stolen car had left his key in the ignition. In effect, the car owner in many instances enticed the criminal to commit the crime.

Sociologists are seriously concerned about this situation as it appears that many of today's hardened criminals would never have committed their first crime if automobile owners had taken proper and simple precautions to protect their property.

The other adverse effects of the increasing frequency of car theft, i.e., at least temporary inconvenience due to loss of transportation; in many instances, direct financial loss to the car owner; indirect financial loss to the large majority of automobile owners in the form of rapidly increasing insurance premiums; etc., are more obvious and generally well recognized.

For these reasons, efforts have been made for many years to educate the public not to leave their keys in unattended automobiles. More recently, numerous systems have been proposed to preclude the driver from leaving his motor vehicle with the key in the ignition.

One such system currently being marketed by a major automobile manufacturer involves an electrical system in which a buzzer is sounded whenever a door is opened and the key still in the ignition switch. The idea here is that the alarm will remind the operator to take the key out of the switch. However, this approach has two major drawbacks. First, electrical systems are always subject to failure and repair or replacement is not necessary in order to operate the motor vehicle. Consequently, it often proves the case that the first failure is the end of the alarm system. Secondly, and probably most importantly, the buzzer has proved to be a source of constant irritation to a large number of car owners. Consequently, many have intentionally and happily disconnected the alarm system shortly after purchasing the car.

Another approach to the problem currently receiving attention is a system wherein the key is ejected from the ignition switch whenever the motor is turned off. Such a system would obviously be just as irritating, if not more so, to many drivers as is the previously discussed alarm system.

Prior art systems have been devised which involve an ignition lock member mounted on the steering wheel which locks the steering wheel when displaced inwardly. A cooperating snap switch or the like prevents the steering wheel from being locked and the engine from being turned off until the key has been removed from the switch. These are relatively complicated and expensive systems and additionally suffer from poor reliability.

There have been still other attempts to provide an ignition system in which the key must be removed from the lock in order to turn off the engine. However, these systems involve the use of specially designed electrical circuitry which makes them expensive to manufacture and relatively unreliable in operation.

This invention overcomes these limitations of locking devices which have heretofore been devised to preclude keys from being left in locks when the lock is in its locked position.

It is therefore a primary object of this invention to provide an improved key-operated safety lock which can only be returned to its locked position from an unlocked position by removing the key therefrom.

It is a further object of this invention to provide an improved key-operated safety lock that will automatically return to its locked position when its key is removed while in an unlocked position.

Another object of this invention is to provide a key-operated safety lock which is inexpensive to manufacture and reliable in operation.

A still further object of this invention is to provide a safety feature for key-operated locks which is entirely mechanized in operation.

Another object of this invention is to provide a safety feature for automobile ignition switch locks which involves only minor changes to devices currently being marketed.

BRIEF DESCRIPTION OF DRAWINGS

The novel features that are considered characteristic of this invention are set forth with particularity in the appended claims. The invention itself, however, both as to its organization and its method of operation, together with additional objects and advantages thereof, will best be understood from the following description of the preferred embodiment when read in connection with the accompanying drawings, and wherein:

FIG. 1 is a side elevation view of an automobile ignition switch lock embodying this invention;

FIG. 2 is a front elevation view of the lock seen in FIG. 1 with the key removed and the lock in its locked position;

FIG. 2a is a front elevation view of the lock seen in FIG. 1 with key inserted and the lock in its locked position;

FIG. 2b is a front elevation view of the lock seen in FIG 1 with key inserted and the lock in its locked position;

FIG. 2c is a front elevation view of the lock seen in FIG. 1 with key inserted and the lock in its second unlocked position;

FIG. 3 is a side view, partly in section, of the spring locking pin taken along line 3—3 of FIG. 2b;

FIG. 4 is a front elevation view of the circular mounting plate of the lock seen in FIG. 1 taken along line 4—4 of that figure; and FIG. 5 is a rear elevation view of the telescoped mounting plate of the lock seen in FIG. 1 taken along line 5—5 of that figure.

SUMMARY OF INVENTION

Briefly stated, in the preferred embodiment of the invention, a key-operated rotatable lock is connected to a first mounting plate on which is positioned a circular electrical contact element. A fixedly positioned mounting plate contains electrical contact members located for selectively being contacted by the circular electrical contact element as the latter is rotated by turning the lock to its unlocked positions. Partial ring-like members extending from the front and back of the fixedly positioned mounting plate and the other mounting plate, respectively, cooperate with a helical spring to exert a force on the rotatable lock whenever it is displaced from its locked position, this force tending to return the lock to its locked position.

A specially configured pawl is pivotally connected to the front face of the lock to cover the keyway whenever a key is not seated therein. When the pawl is raised to permit a key to be inserted into the lock, it is restrained by the key and a pin, extending from the face of the lock, from further pivotal motion in either direction. As the key is turned, the pawl turns with the lock. The free end of the pawl is provided with a taper so as to contact and urge a spring locking pin outwardly to permit the pawl to pass thereunder. The lock is in its first unlocked position after the pawl has passed under the spring locking pin which then returns to its original position and acts against the top edge of the pawl to prevent the lock from returning to its unlocked position under the force of the helical spring. The key may then be turned to a second unlocked position and the force of the helical spring will cause the lock to automatically return to its first unlocked position when the key is released by the operator.

In order for the lock to be returned to its locked position after once reaching its first unlocked position, the key must be withdrawn by the operator. When the key is withdrawn, the force of the helical spring automatically rotates the lock to its locked position.

DESCRIPTION OF THE PREFERRED EMBODIMENT

Referring first to FIG. 1, a key-operated ignition switch lock 10 is shown mounted in an automobile instrument panel 12. To facilitate the installation, an ignition lock housing member 14 includes a threaded section 16 which cooperates with a threaded bore 18 provided in the instrument panel 12. An inner bore 20 of a lock retaining ring 22 is provided with screw threads 24 which also cooperate with the threaded section 16 of the housing member 14 to seat the retaining ring against the instrument panel 12 and thereby fixedly position the ignition lock housing member with respect to the instrument panel.

A rotatable lock 26 including a lock bar 28 is mounted in a lock cylinder 30 snugly seated within a bore 32 of the housing member 14. An enlarged bore section 34 of the housing member 14 communicates with the bore 32 and, further, communicates with progressively enlarged bore sections 36 and 37 of the housing member. A telescoped mounting plate 38 has a recess 40 to receive a projection 42 extending from the rotatable lock 26 and is configured to fit within the bores 34 and 36 of the housing member 14 for rotatable movement with the rotatable lock 26. In this respect, the telescope mounting plate includes a hollowed circular section 44 which is slightly smaller in diameter than the bore 36 and a solid circular section 46 which is slightly smaller in diameter than the bore 34. Mounted to the back face 48 of the telescope mounting plate 38 is a circular electrical contact element 50. A circular mounting plate 52 provided with electrical contact members 54 is mounted within the bore 37 of the housing member 14 and fixedly positioned with respect thereto. Each of the electrical contact members 54 is provided with a terminal 55 passing through the circular mounting plate 52 and extending beyond the back face 57 thereof.

Extending from and connected to the front face 60 of the circular mounting plate 52 is a partial ring-like member 62, another view of which can be seen in FIG. 4. This partial ring-like member 62 is concentrically positioned with respect to a shaft 64 (see FIG. 4) which also extends from the front face 60 of the mounting plate 52. A helical spring 66 is positioned on the shaft 64 having one end 68 thereof in contact with one edge 70 of the ring-like member 62 and the other end 72 thereof in contact with the other edge 74 of the ring-like member 62.

A partial ring-like member 76 extends from the back face 78 of the solid circular section 46 of the telescoped mounting plate 38 and is concentrically positioned with respect to the axis of that member. As may best be seen by reference to FIG. 4 of the drawings, the diameter of the partial ring-like member 76 is such that it fits between the shaft 64 and the partial ring-like member 62 extending from the circular mounting plate 52. FIGS. 4 and 5 illustrate the position of the partial ring-like members 62 and 76 when the rotatable lock 26 is in its locked or "off" position. It will thus be seen that when the rotatable lock 26 is in its locked position, the leading edge 80 of the partial ring-like member 76 is in contact with the end 68 of the helical spring 66. Since the partial ring-like member 76 will rotate with rotatable motion of the rotatable lock 26, the end 68 of the helical spring 66 will be displaced out of contact with the edge 70 of the partial ring-like member 62 whenever the lock is turned in a clockwise direction away from its locked position. The helical spring 66, therefore, will always exert a force through the partial ring-like member 76 tending to return the lock 26 to its locked position whenever it is displaced in a clockwise direction away therefrom.

Referring now to FIG. 2, the front face 82 of the rotatable lock 26 contains a keyway 84 to receive a key 86 (see FIG. 1) and which is in a vertical position when the lock is in its locked position. Insertion of the key 86 into the rotatable lock 26 causes the lock bar 28 to be drawn inwardly out of a slot 85 in the lock cylinder 30. The rotatable lock 26 is then free to be rotated with respect to its cylinder 30 as the key 25 is turned in a clockwise direction. Whenever the lock 26 is returned to its original position, spring forces (not shown) cause the lock bar to re-enter the slot 85 and fixedly position (or lock) the lock 26 with respect to its cylinder 30.

A pawl 87 is pivotally connected to the front face 82 of the lock 26 by a pin 88. A second pin 90 extending from the front face 82 of the lock 26 engages a cammed surface 92 provided in the upper edge of the pawl 87. The cammed surface 92 is so configured and the pin 90 so located that, when the key 86 is not inserted in the keyway 84, the pawl 87 is positioned over the keyway (FIG. 2). Provided in the lock retaining ring 22 is a slot 94 which receives a spring locking pin 96 which extends a slight distance in front of the face 82 of the rotatable lock 26. The other end 98 of the spring locking pin 96 is fixedly positioned with respect to the lock retaining ring 22 (see FIG. 3). In this manner, the front end 100 of the spring locking pin 96 is free to move up and down in the slot 94.

The cammed surface 92 is configured so that the pawl 87 may be pivoted in a counter-clockwise direction to permit the key 86 to be inserted in the keyway 84 (FIG.

2a). As the pawl 87 is rotated on the pin 88 to its furthermost counter-clockwise position to permit insertion of the key 86 into the keyway 84, its free end 102 will pass under the spring locking pin 96. A slot 104 is provided in the lower edge of the pawl 87 and is formed of faces 106 and 108 which seat against a side and the top, respectively, of the key 86 when it is inserted into the keyway 84. In this manner, when the key 86 is in the lock 26 (FIG. 2a), pivotal movement of the pawl 87 on the pin 88 is prevented by the pin 90 and the key 25.

As the inserted key 86 is turned in a clockwise direction to unlock the rotatable lock 26, a tapered edge 110 on the free end 102 of the pawl 87 contacts the spring locking pin 96 and displaces it outwardly in the slot 94 to permit the pawl to pass thereby. When the lock 26 has been turned to its first unlocked or "on" position (FIG. 2b), the pawl 87 has passed the spring locking pin 96 which then returns to its original inward position in the slot 94. At this point, if the operator releases the key 86, the forces exerted by the displaced helical spring 66 through the partial ring-like member 76, the telescoped mounting plate 38, the projection 42 and the rotatable lock 26 will tend to return the rotatable lock to its locked or "off" position. However, such counter-clockwise rotation of the lock 26 will be prevented by the force exerted on the upper edge of the pawl 87 by the spring locking pin 96.

The operator can further turn the key 86 until the rotatable lock 26 is in its second unlocked or "on" position seen in FIG. 2c. Should the operator release the key at this point, the forces exerted by the helical spring 66 through the partial ring-like member 76 will return the lock 26 to its first unlocked position seen in FIG. 2b, at which point the spring locking pin 96 will restrain any further counter-clockwise rotation of the lock.

Whenever the key 86 is withdrawn from the lock 26, the weight of the pawl 87 causes, and the cammed surface 92 cooperating with the pin 90 permits, the pawl to pivot on the pin 88 to its original position covering the keyway 84. Consequently, should the key 86 be removed from the keyway 84 subsequent to the lock 26 being rotated in a clockwise direction to its first or second unlocked position, the pawl 87 will drop to its original position so as to pass under the spring locking pin 96 as the force exerted by the helical spring 66 against the partial ring-like member 76 returns the lock to its locked position. Most importantly, this is the only way, i.e., by removing the key 86 from the keyway 84, that the lock 26 can be returned to its locked position (FIGS. 2 and 2a) after it has been displaced to its first unlocked position (FIG. 2b) or therebeyond towards its second unlocked position (FIG. 2c).

The detailed nature of the electrical leads from the terminals 55 and of the electrical contact member 54 and circular electrical contact element 50 do not form a part of the present invention and will not be discussed to any extent herein. However, those who have operated automobiles will recognize that when the rotatable lock 26 is in its locked position (FIGS. 2 and 2a), the engine is turned off and no power is available to certain electrical equipment in the automobile, such as the radio. When the lock 26 is rotated from its locked position to its first unlocked position (FIG. 2b), the electrical connections are such that energy is available from the battery to certain electrical equipment, again such as the radio. When the lock is further rotated to its second unlocked position (FIG. 2c), the battery is connected to the engine, thereby initiating its operation. After the engine has started on battery power, the lock 26 can then be returned to its first unlocked position (FIG. 2b), at which point the battery is disconnected from the engine and charged by the generator.

In the preferred embodiment illustrated in the drawings, the invention has been applied to a commercially available automobile switch lock currently in general use. Those familiar with the operation of automobiles again will recognize that when the conventional ignition switch lock is turned to its first unlocked position (FIG. 2b) and the operator releases the key, it will remain in this position. Further, when the operator turns the conventional ignition switch lock to its second unlocked position (FIG. 2c) and releases the key, spring forces return the lock to its first unlocked position (FIG. 2b). This situation exists in such conventional ignition switch locks since the partial ring-like member therein, corresponding to the partial ring-like member 76 of this invention, does not effect displacement of a helical spring until the lock has been rotated beyond its first unlocked position (FIG. 2b). In this respect, this invention contemplates a simple change to the partial ring-like members of such conventional locks of increasing their length as represented by the crossed hatched section 112 of the partial ring-like member 76 best seen in FIGS. 4 and 5. The only other changes made to such conventional automobile ignition switch locks to provide the highly advantageous system of this invention is the addition of the pins 88 and 90, the spring locking pin 96 and the specially configured pawl 87. Consequently, it will thus be appreciated that the unique advantages of this system can be realized by providing simple and extremely inexpensive modifications to state-of-the-art devices.

Of course, some automobile ignition switch locks currently on the market are designed such that the key can only be removed when the lock is in its locked position. Obviously, such locks cannot be modified in the manner indicated above so as to realize the benefits of this invention. They would also have to be further modified to permit the key to be removed when in an unlocked position.

Other automobile ignition switch locks currently in use employ a projection which extends inwardly from the lock cylinder to engage a lock bar in the locked position. When a key is inserted into such locks, the lock bar is withdrawn inwardly so as to clear the projection as the lock is turned. The key can be withdrawn when in an unlocked position and the lock bar can be returned towards its locked position, but contact with the other side of the projection prevents the lock bar, and the rotatable lock, from reaching its locked position. A simple additional modification can be made to such devices. The projection can be mounted for pivotal motion in one direction only and spring biased in the other direction. When locked, the lock would be prevented by the projection from moving towards an unlocked position. When unlocked and turned towards its unlocked position with the key removed, the lock bar would cause the projection to pivot and then pass thereunder to attain its locked position, at which time the spring force would return the projection to its original position to complete the locking process.

While this invention represents an entirely new concept for a key operated safety lock, the preceding discussion indicates how the same desirable results can be attained by simple modifications to devices now in use. In either event, it is merely necessary that the key be removable when the lock is in an unlocked position and that means are provided for then automatically returning the lock to its unlocked position.

OPERATION OF THE PREFERRED EMBODIMENT

To summarize the operation of the invention, when the rotatable lock 26 is in its locked position and the key 86 has not been inserted into the keyway 84, the pawl 87 will be positioned over the keyway by its natural pivotal motion on the pin 88 as restrained by the action of the pin 90 against the cammed surface 92. To insert the key 86 into the keyway 84, the pawl 87 is rotated in a counter-clockwise direction on the pin 88 until further movement in this direction is restrained by the pin 90 acting against the cammed surface 92. At this point, the keyway 84 is exposed and the key 86 may be inserted therein. When the key has been inserted, one of its sides and its top abut the faces 106 and 108, respectively, of the slot 104 provided in the lower edge of the pawl 87. As long as the key 86 remains in the keyway 84, pivotal motion of the pawl 87 on the pin 88 is prevented by the key itself and the pin 90.

As the key is turned in a clockwise direction toward the first unlocked position of the rotatable lock 26, the tapered edge 110 of the pawl 87 will contact the spring locking pin 96 and cause it to move outwardly in the slot 94, thereby permitting the pawl to pass by the spring locking pin. Once the pawl 87 has passed the spring locking pin 96, the rotatable lock 26 is in its first unlocked position and the spring locking pin will return to its most inwardly position in the slot 94. At this point, forces exerted by the helical spring 66 on the partial ring-like member 76 tend to return the rotatable lock 26 to its original unlocked position. However, the spring locking pin 96 acts against the upper edge of the pawl 87 to prevent the helical spring 66 from returning the lock to its unlocked position. The operator then rotates the lock 26 to its second unlocked position (FIG. 2c) to start the engine and thereafter permits the force exerted on the lock by the helical spring 66 to return the lock to its first unlocked position (FIG. 2b). At this point, the engine is running and the generator is charging the battery.

The only means that the operator then has of turning off the engine is to withdraw the key 86 from the keyway 84 to facilitate the pivotal motion of the pawl 87 to its original position covering the keyway, in which position the forces exerted on the rotatable lock 26 by the helical spring 66 will automatically return the lock to its locked position with the pawl passing free of the spring locking pin 96.

The invention claimed is:

1. In a key-operated rotatable lock, the improvement comprising:
   first means for continually urging said lock rotationally away from its unlocked position to its locked position; and
   second means for exerting a force against said key when said lock is in its unlocked position preventing rotational movement of said lock towards its said locked position under the force exerted thereon by said first means.

2. The key-operated rotatable lock of claim 1 wherein said first means includes:
   a fixedly positioned mounting plate;
   a second mounting plate fixedly attached to said rotatable lock for rotational movement therewith and spaced from said fixedly positioned mounting plate;
   a shaft centrally positioned on one of said mounting plates and extending toward the other of said mounting plates;
   a first partial ring-like member extending from said one of said mounting plates concentrically positioned thereon with respect to said shaft;
   a helical spring mounted on said shaft having one end thereof in contact with one end of said first partial ring-like member and the other end thereof in contact with the other end of said first partial ring-like member;
   a second partial ring-like member extending from said other mounting plate and positioned thereon so as to fit between said shaft and said first partial ring-like member, one edge thereof contacting said one end of said helical spring whereby said one end of said helical spring will be moved out of contact with said one end of said first partial ring-like member immediately upon displacing said rotatable lock from its said locked position towards its said unlocked position.

3. The key-operated rotatable lock of claim 1 wherein said second means includes:
   a pawl having one end thereof pivotally connected to the front face of said lock;
   means for positioning said pawl over the keyway of said lock when said key is not inserted in said keyway and for preventing further pivotal movement of said pawl when said key is inserted in said keyway and in frictional contact with said pawl; and
   means engaging said pawl when said lock is rotated to its unlocked position to prevent said first means from returning said lock to said locked position until said key is removed from said lock and out of contact with said pawl.

4. The key-operated rotatable lock of claim 1 wherein said second means includes:
   a retaining ring in which said lock is positioned and having a slot formed in its outer face;
   a spring locking pin mounted in said slot and extending in front of said mounting ring;
   a rigid pin extending outwardly from the face of said lock; and
   a pawl having one end thereof pivotally connected to the front face of said lock so as to cover the keyway of said lock and having a groove in its lower edge, one side of said groove engaging a side of said key when said pawl is raised on its pivot to permit said key to be inserted into said keyway, the upper edge of said pawl engaging said rigid pin when said pawl is raised to permit said key to be inserted in said keyway whereby further pivotal movement of said pawl is prevented when said key is positioned in said keyway, the outer edge of the free end of said pawl being tapered to engage said spring locking pin and to permit said pawl to pass by said spring locking pin as the operator turns said key to unlock said lock, said locking pin thereafter engaging the upper edge of said pawl to prevent said lock from returning to its locked position under the force of said first means until said key is removed therefrom.

5. A key-operated electrical switch comprising:
   a stationary electrical contact member;
   a rotatable electrical contact member operably positioned with respect to said stationary electrical contact member;
   a key-operated rotatable lock connected to said rotatable electrical contact member whereby said electrical contact members are out of contact when said lock is in its locked positioned in contact when said key is turned to unlock said lock;
   first means continually urging said lock away from its unlocked position to its said locked position; and
   second means engaging said key when in its unlocked position preventing said key returning to its locked position under the force exerted thereon by said first means.

6. The key-operated electrical switch of claim 5 wherein said first means includes a spring.

7. The key-operated electrical switch of claim 5 wherein said second means includes:
   a retaining ring in which said lock is positioned and having a slot formed in its outer face;
   a spring locking pin mounted in said slot and extending in front of said mounting ring;
   a rigid pin extending outwardly from the face of said lock;
   a pawl having one end thereof pivotally connected to the front face of said lock so as to cover the keyway of said lock and having a groove in its lower edge, one side of said groove engaging a side of said key when said pawl is raised on its pivot and said key inserted into said keyway, the upper edge of said pawl engaging said rigid pin when said pawl is raised to permit said key to be inserted into said keyway whereby further pivotal movement of said pawl is prevented when said key is positioned in said keyway, the outer edge of the free end of said pawl being tapered to engage said spring locking pin and to permit said pawl to pass by said spring locking pin as the operator turns said key to unlock said lock, said locking pin thereafter engaging the upper edge of said pawl to prevent said lock from returning to its said locked position under the force of said first means until said key is removed therefrom.

8. The key-operated electrical switch of claim 1 wherein said first means includes:
   a fixedly positioned mounting plate for said stationary electrical contact member;
   a mounting plate for said rotatable electrical contact member connected to said rotatable lock;
   a shaft centrally positioned on one of said mounting plates and extending towards the other of said mounting plates;
   a first partial ring-like member extending from said one of said mounting plates concentrically positioned thereon with respect to said shaft;
   a helical spring mounted on said shaft having one end thereof in contact with one end of said first partial ring-like member and the other end thereof in contact with the other end of said first partial ring-like member;
   a second partial ring-like member extending from said other mounting plate and positioned thereon so as to fit between said shaft and said first partial ring-like member, one edge thereof contacting said one end of said helical spring whereby said one end of said helical spring will be moved out of contact with said one end of said first partial ring-like member immediately upon displacing said rotatable lock from its locked position towards its unlocked position.

9. The key-operated electrical switch of claim 5 wherein said second means includes:
   a pawl having one end pivotally connected to the front face of said lock;
   means for positioning said pawl over the keyway of said lock when said key is not inserted in said keyway and for preventing pivotal movement of said pawl when said key is inserted in said keyway and in frictional contact with said pawl; and
   means engaging said pawl when said lock is turned to its unlocked position to prevent said first means from returning said lock to said locked position until said key is removed from said lock and out of contact with said pawl.

References Cited
UNITED STATES PATENTS

| | | | |
|---|---|---|---|
| 2,519,940 | 8/1950 | Smith et al. | 200—44 |
| 3,020,523 | 2/1962 | McKeon | 340—52 |
| 3,138,780 | 6/1968 | Jacobsen | 340—52 |
| 3,393,540 | 7/1968 | Rink et al. | 70—237 |

MARVIN A. CHAMPION, Primary Examiner

R. L. WOLFE, Assistant Examiner

U.S. Cl. X.R.

70—455; 200—44